(12) United States Patent
Fisch

(10) Patent No.: US 12,141,992 B2
(45) Date of Patent: Nov. 12, 2024

(54) METHODS AND APPARATUS FOR ORIENTATION KEYPOINTS FOR COMPLETE 3D HUMAN POSE COMPUTERIZED ESTIMATION

(71) Applicant: Martin Adrian Fisch, Fulham (GB)

(72) Inventor: Martin Adrian Fisch, Fulham (GB)

( * ) Notice: Subject to any disclaimer, the term of this patent is extended or adjusted under 35 U.S.C. 154(b) by 0 days.

(21) Appl. No.: 18/495,203

(22) Filed: Oct. 26, 2023

(65) Prior Publication Data

US 2024/0112359 A1    Apr. 4, 2024

Related U.S. Application Data

(63) Continuation of application No. 17/514,034, filed on Oct. 29, 2021, now Pat. No. 11,816,851, which is a continuation of application No. 16/585,998, filed on Sep. 27, 2019, now Pat. No. 11,164,336.

(51) Int. Cl.

| | |
|---|---|
| G06V 10/82 | (2022.01) |
| G06F 18/28 | (2023.01) |
| G06N 3/02 | (2006.01) |
| G06T 7/50 | (2017.01) |
| G06T 7/73 | (2017.01) |
| G06T 7/80 | (2017.01) |
| G06V 10/764 | (2022.01) |
| G06V 40/20 | (2022.01) |

(52) U.S. Cl.
CPC .............. *G06T 7/50* (2017.01); *G06F 18/28* (2023.01); *G06N 3/02* (2013.01); *G06T 7/73* (2017.01); *G06T 7/80* (2017.01); *G06V 10/764* (2022.01); *G06V 10/82* (2022.01); *G06V 40/23* (2022.01)

(58) Field of Classification Search
CPC ........ G06V 10/40; G06V 10/44; G06V 10/46; G06V 10/70; G06V 10/72; G06V 10/763; G06V 10/82; G06V 40/20; G06V 40/23; G06T 2207/20081; G06T 2207/20084; G06T 2207/30196; G06N 3/02; G06N 3/08
See application file for complete search history.

(56) References Cited

U.S. PATENT DOCUMENTS

| | | |
|---|---|---|
| 10,706,584 B1 | 7/2020 | Ye et al. |
| 10,762,644 B1 | 9/2020 | Mahadevan et al. |
| 10,861,184 B1 | 12/2020 | Kalakrishnan et al. |
| 11,182,924 B1 | 11/2021 | Akbas et al. |
| 11,195,418 B1 | 12/2021 | Hong et al. |
| 2020/0086487 A1 | 3/2020 | Johnson et al. |
| 2020/0258243 A1 | 8/2020 | Chang et al. |
| 2021/0078609 A1 | 3/2021 | Barth et al. |

*Primary Examiner* — Andrew W Johns
(74) *Attorney, Agent, or Firm* — Greenberg Traurig, LLP

(57) ABSTRACT

Embodiments of the present invention describe a system that receives an image depicting at least one subject, predicts at least one orientation keypoint associated with a section of the body part of the at least one subject via a neural network detector and determines a three-axis joint rotation associated with the section of the body part of the at least one subject based on at least one orientation keypoint associated with the body part of the at least one subject and at least one joint keypoint associated with the body part of the at least one subject. Orientation keypoints can improve the estimation of an associated joint keypoints, dense pose correspondence and landmark.

12 Claims, 6 Drawing Sheets

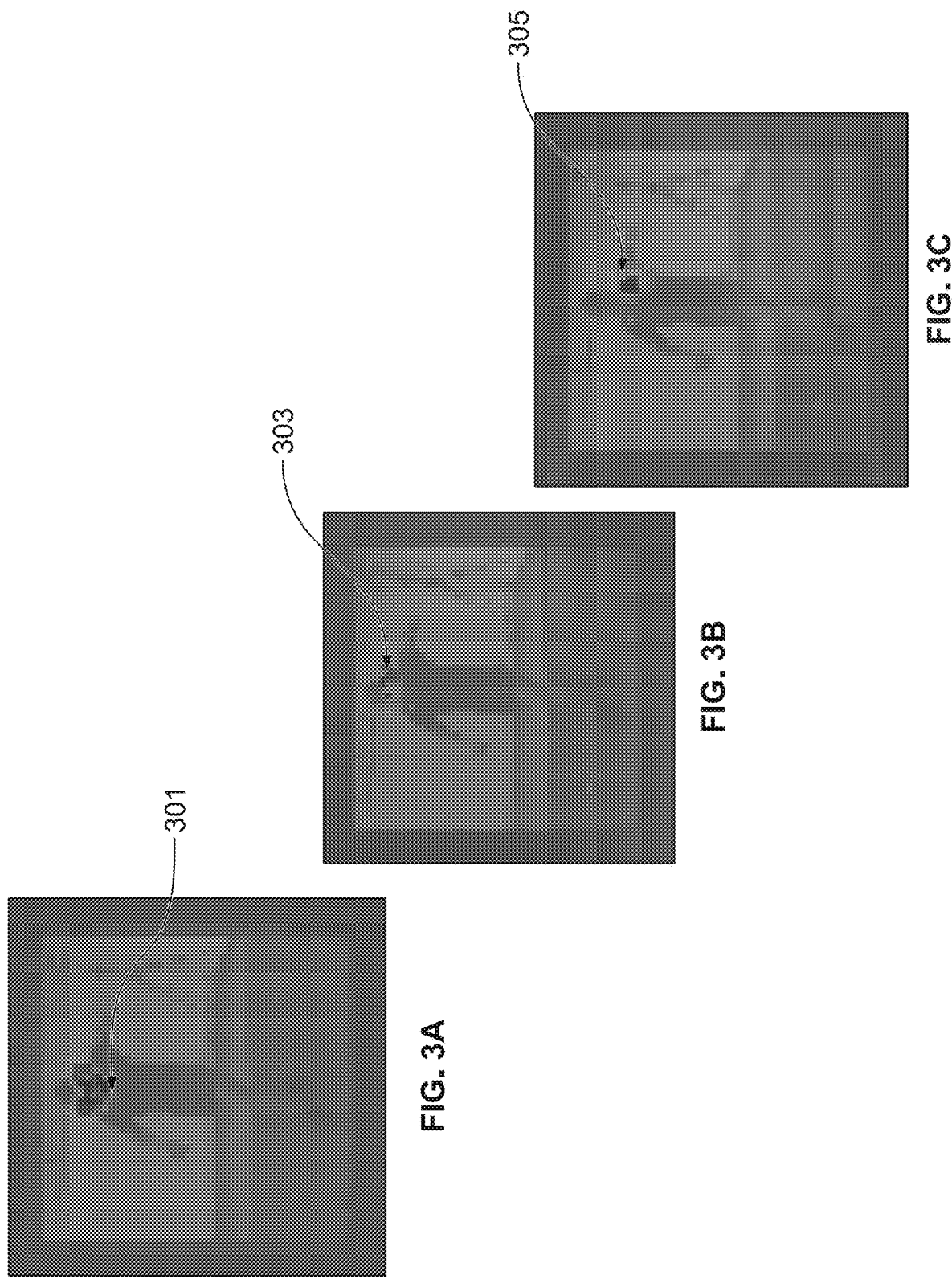

METHODS AND APPARATUS FOR ORIENTATION KEYPOINTS FOR COMPLETE 3D HUMAN POSE COMPUTERIZED ESTIMATION

CROSS REFERENCE TO RELATED APPLICATION

This application is a continuation of and claims priority from co-pending U.S. patent application Ser. No. 17/514,034, filed Oct. 29, 2021, entitled "METHODS AND APPARATUS FOR ORIENTATION KEYPOINTS FOR COMPLETE 3D HUMAN POSE COMPUTERIZED ESTIMATION," which is a continuation of U.S. patent application Ser. No. 16/585,998, filed on Sep. 27, 2019, now U.S. Pat. No. 11,164,336, entitled "METHODS AND APPARATUS FOR ORIENTATION KEYPOINTS FOR COMPLETE 3D HUMAN POSE COMPUTERIZED ESTIMATION," which are herein incorporated by reference in their entirety.

FIELD OF TECHNOLOGY

The present disclosure generally relates to computer-based systems configured for one or more technological computer-based applications and methods for computerized estimation of orientation keypoints for complete 3D human poses.

BACKGROUND OF TECHNOLOGY

Human pose keypoints are typically defined as the major joint positions on the human skeleton. These keypoints can correspond to major skeletal joints, and can include features such as eyes, ears or nose. Identifying and separating the keypoint mappings for multi-person images without mixing body parts from different individuals is a complex problem. Single (Red, Green, Blue) RGB images and videos lack depth information, and images in the wild lack scale information or skeletal measurements. While 2D images can be annotated with 2D keypoints, computing 3D keypoint data is a more complex problem in part because these keypoints lack important skeletal rotation information.

SUMMARY

At least one embodiment described herein includes a system to localize human joints and solve for 3D human poses in terms of both position and full three-axis rotations using at least one image frame. In some embodiments, the system is enabled by a neural network detector that predicts the 3D location of a full set of orientation keypoints. In some embodiments the system predicts a position associated with the at least one subject, size associated with the at least one subject, and a movement associated with the at least one subject.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-6B show one or more schematic flow diagrams, certain computer-based architectures, and/or screenshots of various specialized graphical user interfaces which are illustrative of some exemplary aspects of at least some embodiments of the present disclosure.

FIG. 1 illustrates an example of and implementation of neural network detector of orientation key points according to an illustrative embodiment of the present disclosure.

FIG. 2 illustrates an example of detection of orientation keypoints according to an illustrative embodiment of the present disclosure.

FIG. 3A, FIG. 3B and FIG. 3C illustrate three joint keypoints, according to an illustrative embodiment of the present disclosure.

FIG. 5 illustrates an example of a neural network detector according to an illustrative embodiment of the present disclosure.

FIG. 6A and FIG. 6B illustrates an example of detection of orientation keypoints according to an illustrative embodiment of the present disclosure.

DETAILED DESCRIPTION

Figure 1:
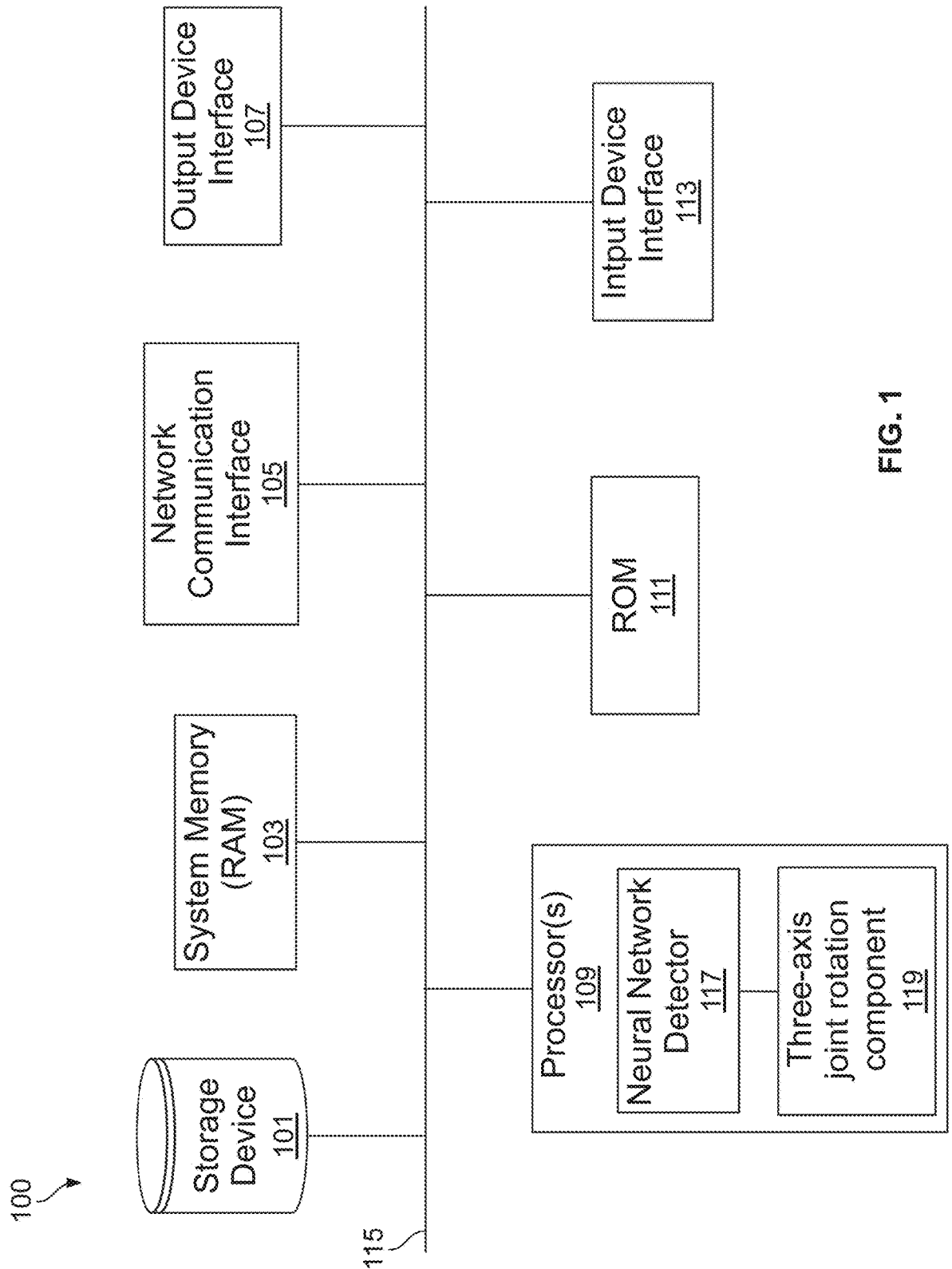

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device)

occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFL's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Applications based on techniques such as keypoint connect-the-dot skeletons superficially compute poses. Such applications can compute limited representations of human poses because most joints still have one degree of freedom, the roll around their axis. For example, a bone stick figure does not indicate which way a head faces, or biomechanical characteristics such as midriff twist or foot and wrist supination/pronation. This lack of joint angle information may constrain the utility of this kind of estimation in real world applications.

Some embodiments of the present invention describe a system to localize human joints and solve for 3D human poses in terms of both position and full 3-axis rotations, using at least one frame RGB monocular image. In some embodiments, the system is enabled by a neural network detector that predicts the 3D location of a full set of keypoints by predicting sets of one dimensional heatmaps, significantly reducing the computation and memory complexity associated with volumetric heatmaps. Applications of the embodiments described herein include but are not limited to: person posture recognition (PPR) for postural ergonomic hazard assessment; enablement of low-cost motion capture freed from expensive studios; improvements to Computer-Generated Imagery (CGI) and video games animation, sports analysis and dynamic posture feedback, surveillance, medical applications and prognosis from physical movement anomalies, and human-computer interaction applications based on motion recognition.

In some embodiments, a neural network detector determines 2D and 3D, keypoints related to the pose of a human from an image, image providing depth information, or video. Such keypoints can then be post-processed to estimate the rotational pose of the human subject.

In some embodiments two feedforward neural networks can be implemented. For instance, a convolutional neural network for detection and a regression-based neural network with fully connected layers for adding depth ('lifting') and refining a pose. Developing a model requires identifying and designing a suitable architecture, obtaining and preparing useful data from which to learn, training the model with the data, and validating the model.

Two types of keypoints are defined below, joint keypoints and orientation keypoints. Joint keypoints correspond to skeletal joints and in some instances, can include features such as eyes, ears, or nose. Orientation keypoints refer to a set or sets of arbitrary points rigidly attached to a joint. They differ from dense pose correspondences in that orientation keypoints do not correspond to a specific or recognizable body part but instead are rigidly anchored in specific directions from a joint (e.g., forward, or to a side). Orientation keypoints can be independent of a body shape. In contrast to markers used in motion capture orientation keypoints include a freedom feature i.e., they do not need to be on the body or a body part. For example, two sets of orientation keypoints can be assigned to the lower left leg, both sets midway between knee and ankle, with one offset in a forward direction and another offset assigned to the outside (e.g., to the left for the left leg).

In some embodiments multiple offsets can be used, for instance 0.5 bone lengths, which for the lower leg implies points well off the body. Bone lengths as a unit have the benefit of being independent of the size of a subject and can be customized to the size of each limb. For some smaller bones, the distance can be increased, for example, to reduce the relative significance of detection errors.

FIG. 1 illustrates an example of and implementation of neural network detector of orientation key points according to an illustrative embodiment of the present disclosure. FIG. 1 conceptually illustrates computing device for the implementation of a neural network detector of orientation keypoints. The compute device 100 can be a computer, smartphone, tablet, notepad and/or any other suitable electronic device. Such a compute device includes various types of processor-readable media and interfaces to operatively couple different types of processor-readable media. Computing device 100 includes a bus 115, a processor 109, a system memory 103, a read-only memory 111, a storage device 101, an input device interface 113, an output device interface 107, and a network communication interface 105.

The bus 115 collectively represents system, peripheral, and/or chipset buses that communicatively connect the numerous internal devices of the compute device 100. For instance, the bus 115 communicatively connects the processor 109 with the read-only memory 111, the system memory 103, and the storage device 101. From these various memory units, the processor 109 can retrieve instructions to execute and/or data to process to perform the processes of the subject technology. The processor 109 can be a single processor or a multi-core processor in different implementations. In some instances, the processor 109 can be any suitable processor such as, for example, a general-purpose processor, a field programmable gate array (FPGA), an application specific integrated circuit (ASIC) and/or other suitable hardware devices.

The read-only memory (ROM) 111 stores static data and instructions that are used by the processor 109 and/or other modules of the compute device. The storage device 101 is a read-and-write memory device. This device is a non-volatile memory unit that stores instructions and data even when the compute device 100 is disconnected from power. In some implementations, a mass-storage device (for example a magnetic or optical disk and its corresponding disk drive) can be used as the storage device 101. Other implementations can use removable storage devices (for example a flash drive, or other suitable type of removable storage devices) as the storage device 101.

Similar to the storage device 101, the system memory 103 can be a read-and-write memory device. Unlike storage device 101, however, the system memory 103 is a volatile read-and-write memory, such as a random-access memory.

The system memory 103 stores some of the processor-executable instructions and data that the processor 109 uses at runtime including processor-executable instructions to instantiate and maintain a neural network detector 117 and a three-axis joint rotation computing component 119 described below. Alternatively, the neural network detector and a three-axis joint rotation computing module or parts of the maintain a neural network detector 117 and a three-axis joint rotation computing component 119 can reside in the storage device 101. Accordingly, states and/or properties of an instance of the neural network detector 117 and a three-axis joint rotation computing component 119 can prevail in non-volatile memory even when the compute device 100 is disconnected from power. Thus, in some implementations, the front-end synchronized application can be configured to automatically relaunch and synchronize (if required) when the compute device 100 is reconnected to power. In such a case the detector system can execute according to the last state of the neural network detector 117 and a three-axis joint rotation computing component 119 stored in the storage device 101 and synchronization may be used for those elements the detector system that have changed during the time the compute device 100 was turned off. This is an advantageous feature because instead of generating network traffic to synchronize all the elements of the neural network detector 117 and a three-axis joint rotation computing component 119 when the computing device is reconnected to power, only a subset of the elements may be synchronized and thus, in some instances some computational expense can be avoided. In some implementations, local instances neural network detector 117 and a three-axis joint rotation computing component 119 can be logically and operatively coupled.

In some embodiments, the executable instructions to run the processes described herein on the computing device 100 can be stored in the system memory 103, permanent storage device 101, and/or the read-only memory 111. For example, the various memory units can include instructions for the computing of orientation keypoints including executable instructions to implement a neural network detector 117 and three-axis joint rotation component 119 in accordance with some implementations. For example, in some implementations, permanent storage device 101 can include processor executable instructions and/or code to cause processor 107 to instantiate a local instance of the neural network detector 117 operatively coupled to a local instance of a three-axis joint rotation component 119. Processor executable instructions can further cause processor 207 to receive images or videos from non-local computing devices not shown in FIG. 1.

In some embodiments the processor 109 coupled to one or more of memories 103 and 111, and storage device 101 receive an image depicting at least one subject. The processor can predict at least one orientation keypoint associated with a section of the body part of the at least one subject via a neural network detector 117 and compute a three-axis joint rotation via the three-axis joint rotation component. The orientation keypoints can be associated with the section of the body part of the at least one subject based on at least one orientation keypoint associated with the body part of the at least one subject and at least one joint keypoint associated with the body part of the at least one subject.

In some embodiments the processor 109 coupled to one or more of memories 103 and 111, and storage device 101 receive an image depicting at least one subject. The processor can predict at least one orientation keypoint associated with a section of a body part of the at least one subject via the neural network detector 117. Predict an aspect of a pose associated with the at least one subject based on the at least one orientation keypoint, the aspect of the pose associated with the at least one subject can include a position, size, and/or a movement associated with the at least one subject.

In some implementations, the components 117 and 119 can be implemented in a general purpose and/or specialized processor (e.g., processor 109 configured to optimize the tasks performed by these components). In other implementations, the components shown in the processor 109 can be implemented as a combination of hardware and software. For example, the storage device 101 (or other suitable memory in the compute device 100) can include processor-executable instructions to render a graphical representation on a display comprising a plurality of marks indicative of the three-axis joint rotation associated with the section of a body part of the at least one subject. Such a graphical representation is indicative of a pose of the at least one subject. The pose of the subject can include one or more joint positions and at least one joint angle associated with the section of the body part.

The bus 115 also connects to the input device interface 113 and output device interface 107. The input device interface 113 enables the computing device 100 to receive information or data, for example, images or video.

Output device interface 107 enables, for example, computed changes of positions one or more orientation keypoints over time. The orientation keypoint can be computed to be outputted in a two-dimensional space or in a three-dimensional space. Likewise, the output device 107 can render or output calculated rotational velocity or acceleration associated with one or more orientation keypoints based on changes in position of the at least one orientation keypoint. Output devices used with output device interface 107 can include, for example, printers, audio devices (e.g., speakers), haptic output devices, and display devices (e.g., cathode ray tubes (CRT), liquid crystal displays (LCD), gas plasma displays, touch screen monitors, capacitive touch-screen and/or other suitable display device). Some implementations include devices that function as both input and output devices (e.g., a touchscreen display).

As shown in FIG. 1, bus 115 can also couple compute device 100 to a network (not shown in FIG. 1) through a network communication interface 105. In this manner, the computing device 100 can be part of a network of computers (for example a local area network ("LAN"), a wide area network ("WAN"), or an Intranet, or a network of networks, for example the Internet. Any or all components of computing device 100 can be used in conjunction with the embodiments described herein.

Figure 2:
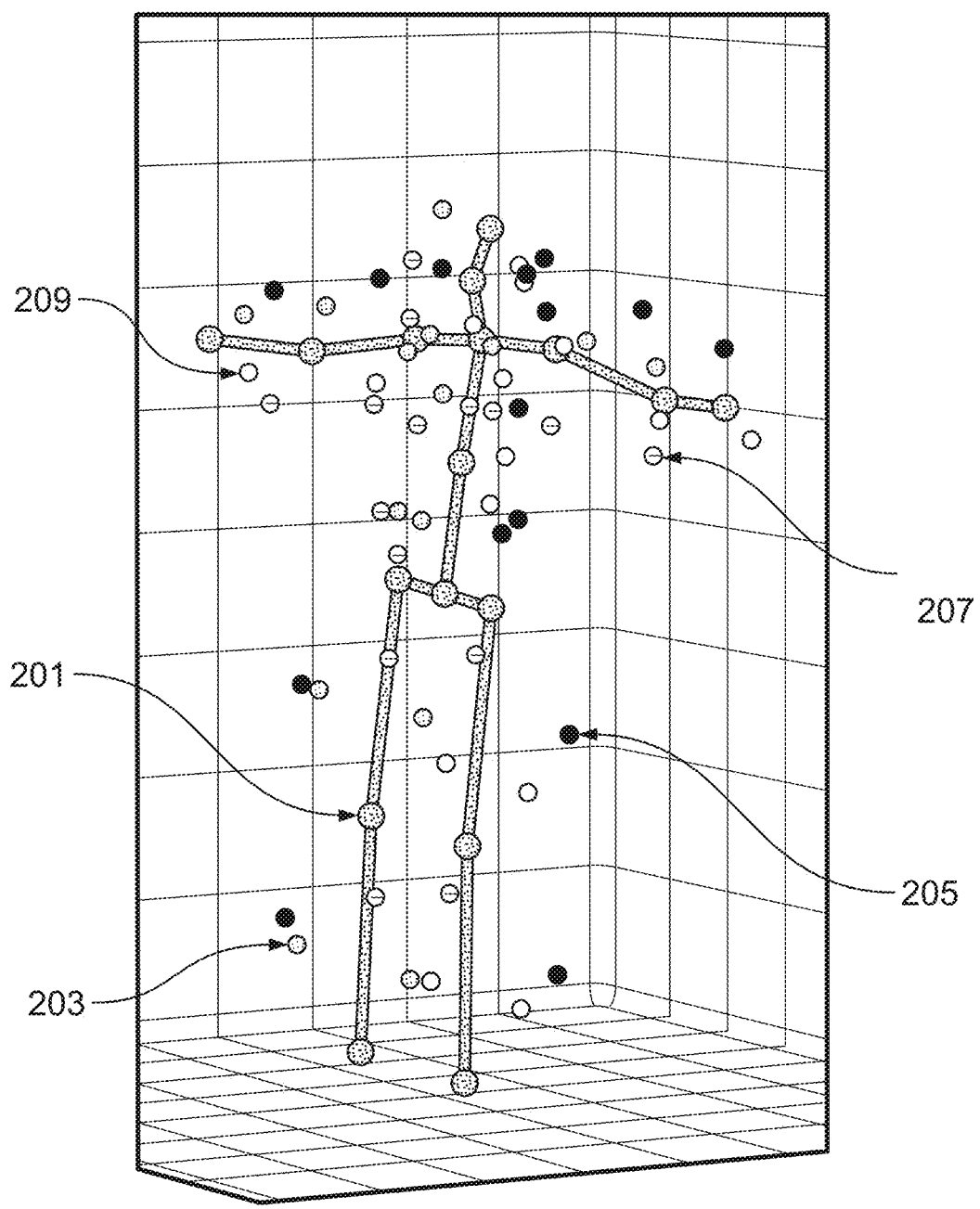

FIG. 2 illustrates an example of detection of orientation keypoints according to an illustrative embodiment of the present disclosure. Circles located within the skeletal structure shown in FIG. 2 represent joint keypoints (e.g., joint keypoint 201). Orientation keypoints such as 203 represent a forward direction from the center of a section of a body part. Orientation keypoints such as 205 represent an outward direction from the center of a section of a body part, for example, to the left for left side limbs and trunk, and to the right for right side limbs. Orientation keypoints such as 207 represent an inward direction from the center of a section of a body part. Orientation keypoints such as 209 represent a backward direction from the center of a section of the body part. Other directions that can be represented by orientation keypoints can include higher direction from the center of a section of the body part, a lower direction from the center of a section of the body part and/or other suitable direction with respect to the center of a section of the body part. It is appreciated that orientation keypoints can be located outside the sections describing the skeletal model of a subject.

In some embodiments the system can be enabled at least in part via a neural network. A neural network is a computerized model including a series of functions and operations which are combined to process and transform input data into some form of output data. For example, some networks can be implemented to perform regression, others to perform classification, and yet others to effectively summarize data through dimension reduction.

In some embodiments a neural network may be implemented with layers, where each layer can include multiple nodes which perform operations on the inputs. Different nodes within a layer can vary from each other by using different constants to, for example, multiply the inputs, and some may only take a subset of the inputs from the previous layer. Different layers may perform different operations. The layers can then be stacked to perform these multiple operations in a series, with to generate a final output.

In some embodiments the neural network can be trained by the repeated use of data to discover parameters which best characterize a solution. For instance, a neural network can be trained using a supervised learning technique. Such a supervised learning technique uses the ground truth, or known correct characterization, to guide the neural network learning process by analyzing errors between the neural network outputs and the ground truth. For example, when predicting human poses from images, the neural network can use datasets which provide measurements of the actual pose, as captured by specialized equipment.

In some embodiments training of the neural network can be based on an intermediate supervision technique. Such a technique provides guidance based on the results from a middle stage in the neural network model's calculation. Intermediate supervision can be used with the same supervision signal in cases where the later stage further refines the results. Alternatively, the intermediate signal can be a different target to guide the model into first solving a related problem which may then be useful in getting to the final predictions.

In some embodiments training of the neural network can be based on weakly supervised learning, using one or more metrics to provide feedback during training. For example, the greater availability of 2D human pose annotation compared to 3D annotations can enable weakly supervise training by re-projecting predicted 3D poses into 2D, and comparing the reprojection to the 2D annotation.

In some embodiments one or more of supervised training, intermediate supervision, weakly supervision individually, or in any combination thereof can be employed. For instance, supervised training by itself, weakly supervised training by itself, or a combination of supervised learning with intermediate supervision.

In some embodiments each neural network node can be a function $f(x)$ which transforms an input vector x into an output value. The input vectors can have any number of elements, often organized in multiple dimensions. A network chains different functions $f$, $g$, and $h$ to produce a final output y, where $y=f(g(h(x)))$. As each intermediate layer can have many nodes, the number of elements and input shapes can vary.

In some embodiments some functions computed within the neural network node can include:

linear combinations—wherein nodes sum the inputs after multiplying them by a fixed weight (i.e. the vector inner product).

sigmoid or logistic function—these functions transform a single input, usually the result of a linear combination node, into a narrow range of −1 to 1, approaching the boundaries as the input approaches +/−infinity. This is a non-linear and continuous operation.

rectified linear units—these functions floor a value at zero, eliminating negative results. This creates a non-linearity at value zero.

max pooling—these functions take the maximum of the inputs and can be used to reduce the number of neurons feeding into forward layers through aggregation, and manage the computational cost.

normalization—there are a variety of normalization functions including a type batch normalization, which transforms a batch of different samples by the sample mean value and sample standard deviation. Batch normalization can speed up training by maintaining a broadly steady range of outputs even as the inputs and weights change. For inference values can be frozen based on the mean and standard deviation of the training set.

softmax layer—this technique rescales input neurons by taking their exponential values and dividing by the sum of these values. This means all values sum to one, approximating a probability distribution. Due to the exponential function, higher values will be accentuated and the resulting distribution will be leptokurtic.

In some embodiments the neural network can be implemented as a feedforward neural network. In a feedforward neural network, the data flows from the input to the output, layer by layer, without looping back—i.e. the outputs of the neural network may not provide feedback for the calculations. This flow is called a forward pass and depending on the size of the neural network can represent millions of calculations for a single input sample.

In some embodiments loss refers to the amount of error in the neural network model, with the goal of learning generally to minimize the loss. There are many different measurements of loss. For regression related tasks, loss is most often the mean squared error. These measures, for some sample of data, the average difference between the predicted values and the actual values, squared. Large outlier losses are particularly penalized with this measure and its popularity stems from its simplicity, mathematical convenience and prevalence in statistical analysis. Another alternative is the mean absolute error, which does not highly weight large errors. The embodiments described herein can be implemented using one or more loss functions including mean squared error, mean absolute error, or other suitable loss function.

In some embodiments a stochastic gradient descent procedure can be applied to converge toward an optimal solution. The method is stochastic because data is randomly shuffled and fed to the current state of a neural network model. The gradient is the partial derivative of the neural network model parameters and at each iteration the parameters can be updated by a percentage of the gradient, i.e., the learning rate. Accordingly, the values of the parameters progress toward values which minimize the loss for the training data at each repeated iteration.

In some embodiments the neural network model can be configured through backpropagation. This means that each time training data passes through the model, a function calculates a measure of loss based on the resulting predictions. From the resulting loss the gradient of the final layer can then be derived, and consequently each previous layer's gradient can be derived. This continues until the beginning of the neural network model and then the complete gradients are used to update the model weights like a stochastic gradient descent.

In some embodiments as a neural network model becomes deeper (many layered) to handle more complicated analysis, training can become impaired as the gradient of neurons in middle layers may approach zero. This can limit the ability of the neural network model to learn as weights cease to update when the gradient nears zero. This limitation can be overcome by different techniques including Rectified Linear Units (ReLU). ReLUs are less susceptible to the vanishing gradient than other activation functions such as sigmoid, as the derivative only changes when the activation is negative. Rectified Linear Units can be used as the principle activation function. Residual connections allow layers to pass data forward and focus on modifying the data only by applying additive changes (i.e. residuals), and can be used to develop deeper networks without vanishing gradients.

In some embodiments the neural network model can be implemented as a convolutional neural network. Convolutional neural networks can exploit the structure of an image to identify simple patterns, and then combine the simple patterns into more complex ones. Each filter in a convolutional neural network scans an adjacent area of the previous layer, combining the values based on learned weights. The same filter, with the same weights, can then be slid across relevant dimensions to find a pattern throughout an input. The filter generally penetrates the full depth of a layer, recombining lower level features to express higher level features. The early levels of an image targeted convolution network typically find edges, then lines and then basic shapes like corners and curves. This often means that the early layers of a trained convolutional neural network can be reused in other networks in a process called transfer learning.

FIGS. 3A-3C illustrate three joint keypoints, according to an illustrative embodiment of the present disclosure. The darker spots 301, 303, and 305 each represent a joint keypoint localized by the system. In some implementations heatmaps can be used as intermediate representation of an input of a convolutional neural network. In some instances, instead of directly predicting x and y coordinates of a feature, which would be a regression task, a prediction draws a point or blob in the predicted location. The higher the value ('heat') for a given pixel the more likely the convolutional neural network model indicates that the feature is centered in that position. Heatmaps can be trained by drawing a gaussian blob at the ground truth location, and predicted heatmaps can be directly compared to these ground truth heatmaps. This technique allows a vision based network to remain in the vision space throughout training. For inference, either the pixel with the maximum value can be converted to a location address (hardmax) or a probabilistic weight of values can be converted to a blended address (soft argmax). An example of this technique is illustrated in FIGS. 3A-3C.

Figure 4A:
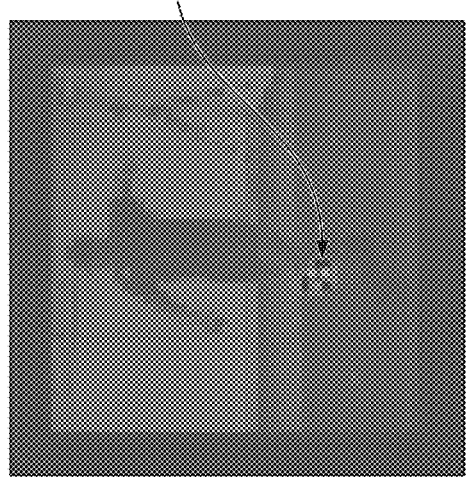
FIG. 4A, FIG. 4B and FIG. 4C illustrate three orientation keypoints, according to an illustrative embodiment of the present disclosure.
Figure 4B:
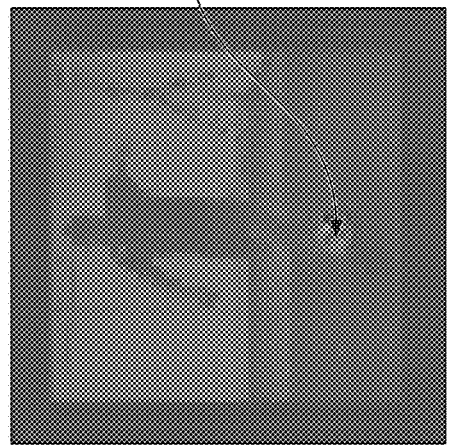
Figure 4C:
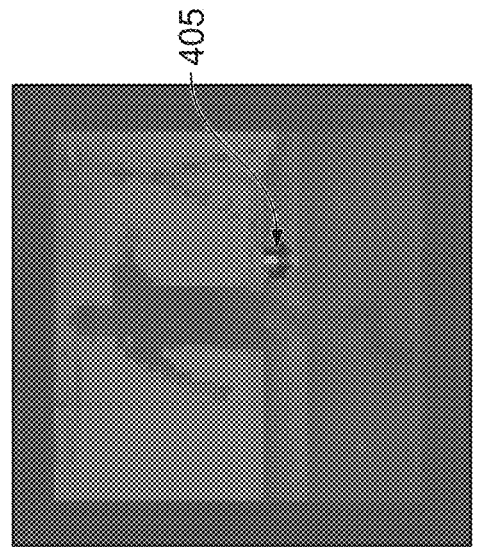

FIGS. 4A-4C illustrate three orientation keypoints, according to an illustrative embodiment of the present disclosure. The darker spots 401, 403, and 405 each represents an orientation keypoint localized by the neural network. The darker spots represent a convolutional neural network model localizing a point.

In some embodiments the convolutional neural network can recover some of the resolution that can be lost on a heatmap. For example, additional techniques that can be used include 2D and 3D hardmax heatmaps. Thus, in some instances, results can be shifted by 0.25 pixels based on which neighboring pixels has the next highest prediction. This technique can effectively double the resolution in each direction. In some instances, during training, when generating target heatmaps symmetrical Guassian rounded to the nearest heatmap pixel may not be used, but instead increasing the resolution data in a more precise discrete sampling of a probability distribution function when generating a target may be incorporated. This technique can allow an almost perfect reconstruction of a high-resolution location from the heatmap when using, for example, a spatial soft argmax layer.

In some embodiments various strategies and techniques can be used to mitigate overfitting of the neural network model. Some of these techniques include using diverse training data, data augmentation, early stopping techniques, regularization, and dropout techniques. In some instances, the neural network can be trained with more and diverse training data to reduce overfitting. Data augmentation, is a technique where various transformations are used on the available training data to synthetically increase the size of the training data. Early stopping is the process of stopping training when validation loss is no longer improving, even if the training loss is still declining. Regularization is a technique based on adding a penalty term to the loss based on the magnitude of the weights. Resulting in the learning of fewer or smaller weights and avoiding learning training noise. Dropout is a technique which randomly shuts down different nodes during training iterations to develop resilience and reduce the neural network model's ability to rely on specific idiosyncratic features which may not generalize well.

In some embodiments the neural network model can use or implement a Perspective-n-Point (PnP) technique. Perspective-n-Point is a computation technique that takes a set of 2D image points and a rigid 3D model to solve for the models transform in a camera frame. Three non-co-linear points can be projected onto a 2D plane and can limit the rotations to, for example, a maximum of four possibilities ('P3P'). A fourth non-co-linear point can be used to calculate the rotation. Such a PnP technique can be used to compute the best fitting transform, for instance, based on minimizing a reprojection error. Accordingly, three-axis joint rotations associated with subject's body part can be determined via a perspective-n-point computational technique.

In some embodiments rotations from images can be determined following detections by a convolutional neural network model. For instance, given at least four keypoints identified in 2D space related to a single joint, 3D rotations can be determined using the convolutional neural network model.

In some embodiments, a variant of the P3P technique can be used when four points for each joint are given. In such a P3P variant the fourth point can be used to distinguish between subsequent orientation keypoints per joint. For instance, to predict six orientation keypoints per joint, and implementation can use four sets of predictions and P4P with two bone ends and one orientation point for each set. Thereafter, the fourth set prediction can be averaged by using a quaternion averaging algorithm. This technique can overweight bone endpoint detections in an overall solution.

In some embodiments a transform (rotation matrix, scale and translation vector) which minimizes the least square error between two sets of points can be determined based on a set of estimated 3D points. An optimization equation can be determined based on, for example, a Singular Value Decomposition (SVD) technique to calculate the rotation matrix and scale from the covariance matrix of the two sets of points, re-centered and normalized by the Froebenius norm. Such a technique can be used to determine the transforms for individual comparisons, joint sets and batches of joint sets.

In some embodiments a full set of predicted orientation keypoints can be jointly transformed (with a single transformation matrix) to match the original points. Thus, dealing with scaling—a monocular image may not have scale or distance information—overcoming a setback to differentiate between an unusually large person at a distance and a small person positioned closer to the camera.

In some embodiments the Procrustes transform can be used to find the best fitting scale and distance values. The Procrustes transform can optimally rotate a predicted skeleton relative to a camera to minimize positional errors. Accordingly, three-axis joint rotations associated with a subject's body part can be computed via a Procrustes computational technique. Likewise, a three-axis joint rotation associated with a subject's body part can be computed via a Kabsch computational technique. Likewise, a three-axis joint rotation associated with a subject's body part can be determined via a regression computational technique. In some implementations, three-axis joint rotations and the full rotation of a body part relative to a camera can be computed using other techniques described herein.

As discussed above, in some embodiments a convolutional neural network use heatmaps to make positional or vector predictions, either through a max operation or a soft argmax integration. In some implementations 2D heatmaps can be used to predict 2D points, which may square the resolution. In some instances, predicting 3D points with 3D heatmaps can cube the resolution, which can lead to a need of large memory and calculation footprint during training and inference process. In such a case, increasing the resolution can become prohibitively expensive. In some embodiments volumetric heatmaps can be replaced with three linear heatmaps, one for each axis. The application of such a technique achieves results with a small footprint, while enabling higher resolution. For instance, a 256 resolution heatmaps can be used instead 64 resolution heatmaps resulting in a considerably sparser model. In some implementations, more accurate results can be achieved, reducing the dimensionality to a single dimension as opposed to solving for 3D heatmaps using a pair of 2D heatmaps in the xy and yz.

Figure 5:
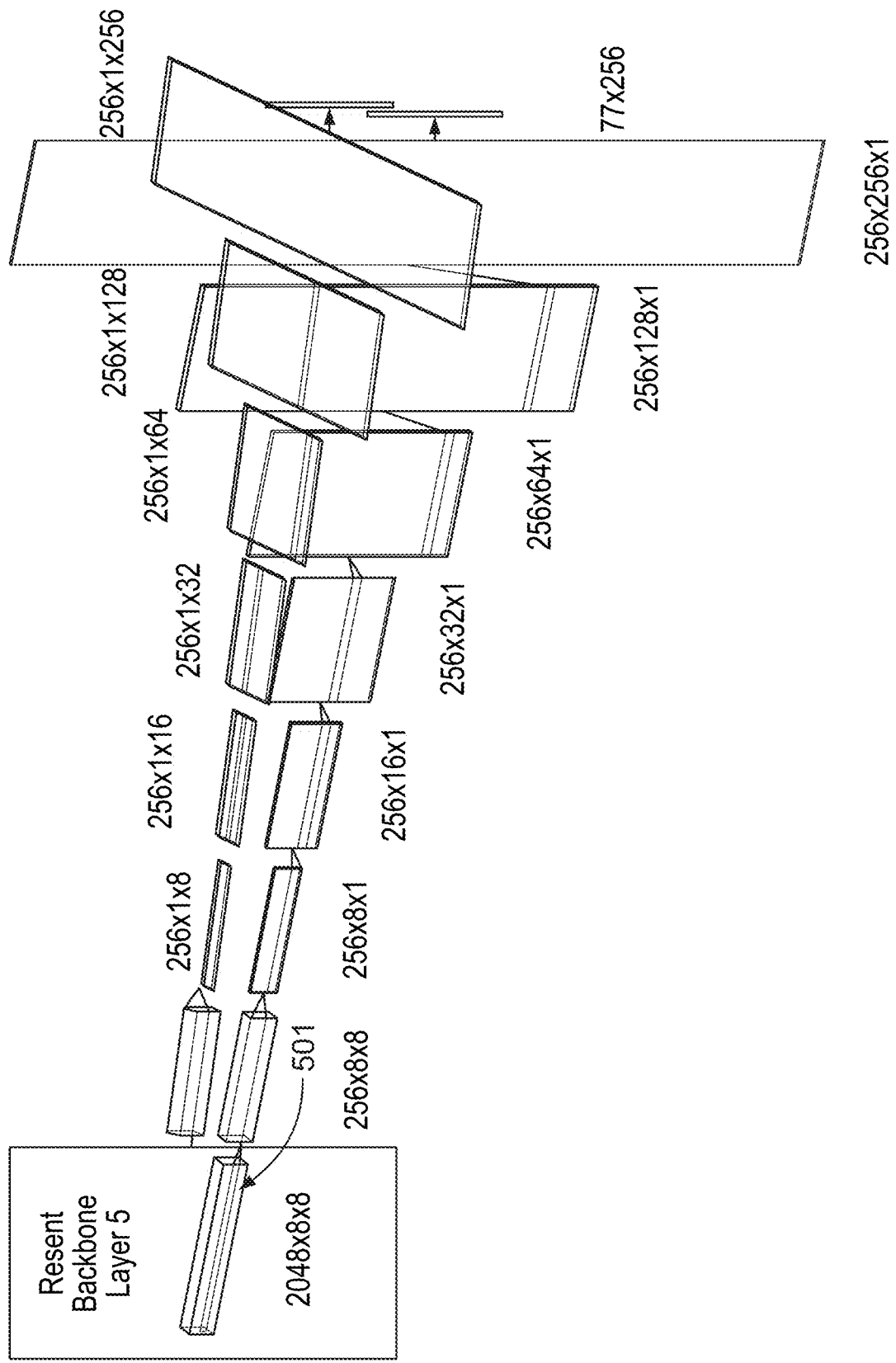

FIG. 5 illustrates an example of a neural network detector according to an illustrative embodiment of the present disclosure. In FIG. 5 a Resnet backbone is flattened from 3 to 2 dimensions and then convolution transpose layers can expand along a single dimension. Specifically, FIG. 5 illustrates a 2D neural network detector with branches for X and Y however, Z can be included straightforwardly.

In some embodiments, the penultimate layer of the Resnet-50 backbone (501 in FIG. 5) can be sampled, a 2048 channel 8×8 tensor, into a 256 channel 8×8 tensor using 1×1 kernel convolutions. Thereafter the tensor can be flattened into the x-dimension with an 8×1 convolution, which sliding along the x-dimension. From this flattened form, transpose convolution layers can be used to up sample, for example, only the last, singular dimension. The number of upsamples can depend on a target resolution. As this stage is inexpensive in one dimension, a 256 resolution can be computed to match the initial image.

In some embodiments, a final 1×1 convolution layer can collapse the channels into a 1D heatmap for each orientation keypoint along the single dimension. Each heatmap can represent a neural network's estimate of an orientation keypoint position along the single axis. The same technique can be applied for the Y dimension, flattening its own forked head from the Resnet backbone. The heatmaps can be visualized as 1 dimensional scans in different directions across the image.

In some embodiments depth may not be a native dimension, thus the same principle with a modified technique to flattening for depth can be applied. For instance, by flattening the backbone, while adding a depth dimension, into a 256 channel 8×8×8 blocks. Thereafter, a convolution layer (8×8 kernel which may only slide in the depth dimension) can collapse the first two dimensions of the 8×8×8 into 1×8 block. For depth computation, a double of the resolution can be used, depending on the angle of a camera and the position of the subject, the depth dimension may exceed the height and width. This characteristic may entail one additional convolution transpose layer. In some instances, the same resolution can be preserved and rescaled the ground truth depth.

In some embodiments, a final number of heatmaps can double the number of orientation keypoints for 2D estimates and triple for 3D estimates, an increase comparable to footprint savings of switching to linear resolution. One of the advantages of the embodiments disclosed herein is that a meaningfully large reduction in multiply-add operation can be processed, particularly as the number of orientation keypoints increases, when predicting 3D or when targeting a higher resolution.

In some embodiments a lifter/refiner can be implemented based on a regression model using fully connected ReLU layers. Likewise, such a lifter/refiner can be implemented as a 1D convolutional network to include time 1D convolutions for video analysis. In some implementations. The lifter/refiner can be used to process three-axis joint rotations.

In some embodiments a neural network detector (e.g., a crosshair detector or other suitable neural network detector) can make direct pixel and/or voxel location predictions, sufficient to generate three-axis joint rotations with the PnP based computational techniques, Procrustes based computational techniques, Kabsch based computation techniques, and/or Singular-Value-Decomposition computational techniques. Such computational techniques can be executed by, for example, the three-axis joint rotation component discussed in FIG. 1. In some implementations the neural network can learn scales (e.g., human scales) and convert them into real world dimension to make unadjusted predictions. These techniques can be enabled via the lifter/refiner. In some instances, the extra linear network can also focus further on overall structure of the pose, learning sufficient information to correct individual predictions of the network. In some instances, the pose can include joint positions and and/or joint angles associated with a subject's body or section of the body.

In some embodiments the lifter/refiner can be implemented with a neural network inner block including a linear layer, followed by batch normalization, dropout and rectified linear units. A neural-network outer blocks can include two inner blocks and a residual connection. An initial linear layer can convert from the number of keypoint inputs, flattened to a single dimension, into the linear width of the network. A final layer can convert from the width to the number of predictions. In some instances, substantial gains can be achieved from widening the neural network, for example, by increasing the size of each linear layer by 50% from 1024 to 1536, which approximately can double the total parameters. This helps to accommodate 3-5× as many keypoint inputs and outputs from incorporating orientation keypoints.

In some embodiments, the lifter/refiner may be implemented without using depth predictions form a detector model. In some instances, 2D points can provide sufficient information for the lifter/refiner to make more accurate, refined predictions of depth position.

In some embodiments the neural network can be trained with a dataset (e.g., MPII dataset). Such a dataset MPII can act as a regulizer against the narrowness characteristic of other datasets. Using the dual dataset technique for training, can prevent the neural network model from overfitting the training subjects/samples and plateauing when faced with the validation subjects/samples.

In some embodiments the neural network model can be trained using multiple types of datasets including but not limited to MPII, DensePose, Surreal, ImageNet, COCO, HumanEva, and Pnoptic. Preprocessing techniques can include configuring a layer of processing in bulk to extract the most relevant parts of the dataset while avoiding unnecessary repeated calculations during training. Likewise, preprocessing techniques can include preprocessing at the time of training mainly as a form of data augmentation and/or to tailor the data to the needs of an implementation.

In some embodiments a layer of processing in bulk is applied to extract the most relevant parts of a dataset while avoiding unnecessary repeated calculations during training. Thereafter a subsequent technique can be applied including preprocessing at the time of training as a form of data augmentation or to tailor the data to the needs of an implementation.

In some embodiments orientation keypoints add points which may lie outside the silhouette of a subject and outside a tighter fitting bounding box. In some instances, an affine transformation of the keypoints, can be applied to ensure most keypoints can be mapped to viable heatmap coordinates, shifting and shrinking their coordinates by e.g., 20% to fit within the resolution of an image. Thus, each heatmap can cover a wider area than the image itself. This technique can maximize the resolution of the visual clues in an image while still being able to predict the orientation keypoints outside a silhouette.

In some embodiments a transfer learning training technique can be used to provide the initial backbone of a neural network. In some instances, the last layers of the neural network model can be configured to be focused on the classification task. In some implementations, most of the neural network model can use convolutional layers to filter and sift through visual clues in an image. In some instances, some limitations of using some types of datasets (e.g., Human3.6 million dataset) can be mitigated by using the earlier layers pretrained on a diverse dataset. Thereafter, the neural network model can be attached to the output of the Resnet layers to learn keypoint localization.

In some embodiments the neural network model can process a loss function based on mean square error during the training phase of the neural network. Likewise, other types loss functions such as a loss function based on absolute error can also be used during the training phase. For example, a mean square function can be initially used to quickly train the head of a neural network before switching to a loss function based on absolute error for further fine-tuning. In some implementations, various balances of the weights between the loss functions of different datasets can be applied. For instance, the loss on the Human3.6 dataset and MPII dataset can be settled on 0.75/0.25 as shown in the equation below:

$$Loss_{dual} = 0.75 Loss H3.6m_{77\ kps} + 02.5 Loss MPH_{visiblejkps} * MagnitudeAdj$$

In some embodiments the neural network detector can be trained using mini-batches of 32 images with 16 from each dataset. This technique can include freezing the Resnet and train for 25k iterations using L2 loss with a 0.001 learning rate. Thereafter, the technique can proceed to switching to L1 and unfreeze the last layer group of the Resnet backbone and train for another 25k iterations, before dropping the learning rate for 10k iterations to 0.0005 and 15k iterations at 0.00025. Followed by unfreezing the penultimate layer of the Resnet backbone for final fine-tuning and training for another 25k iterations.

Figure 6B:
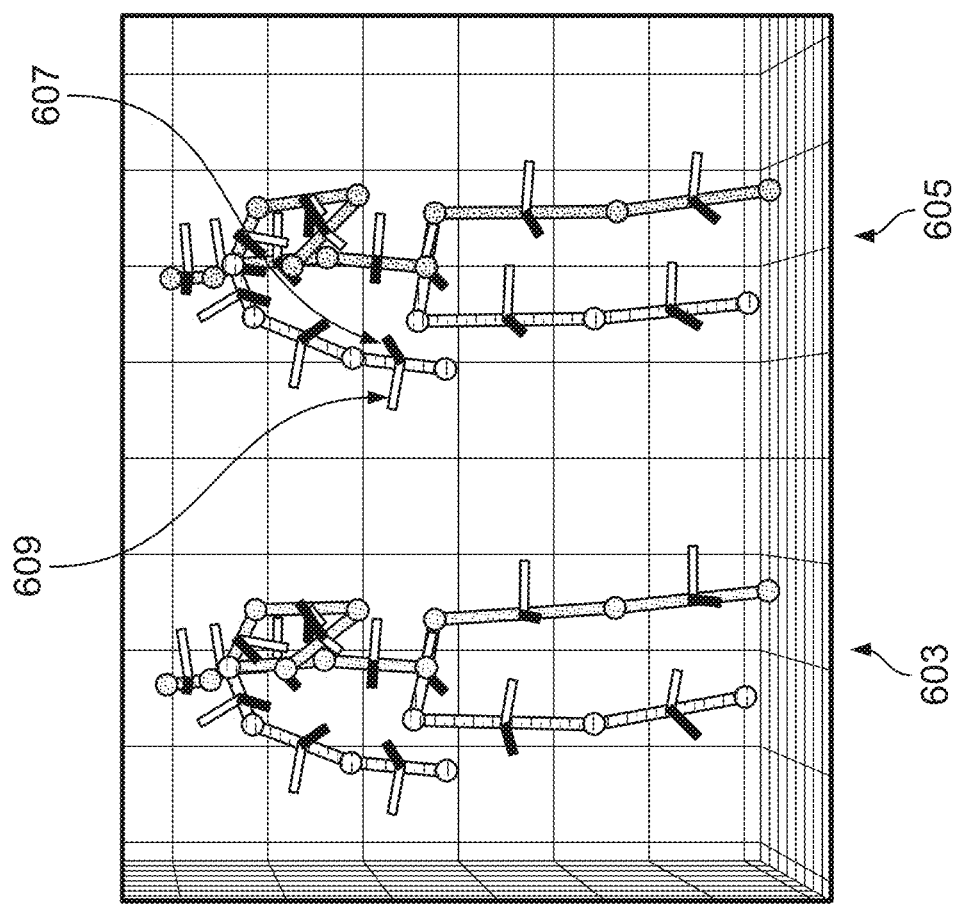
Figure 6A:
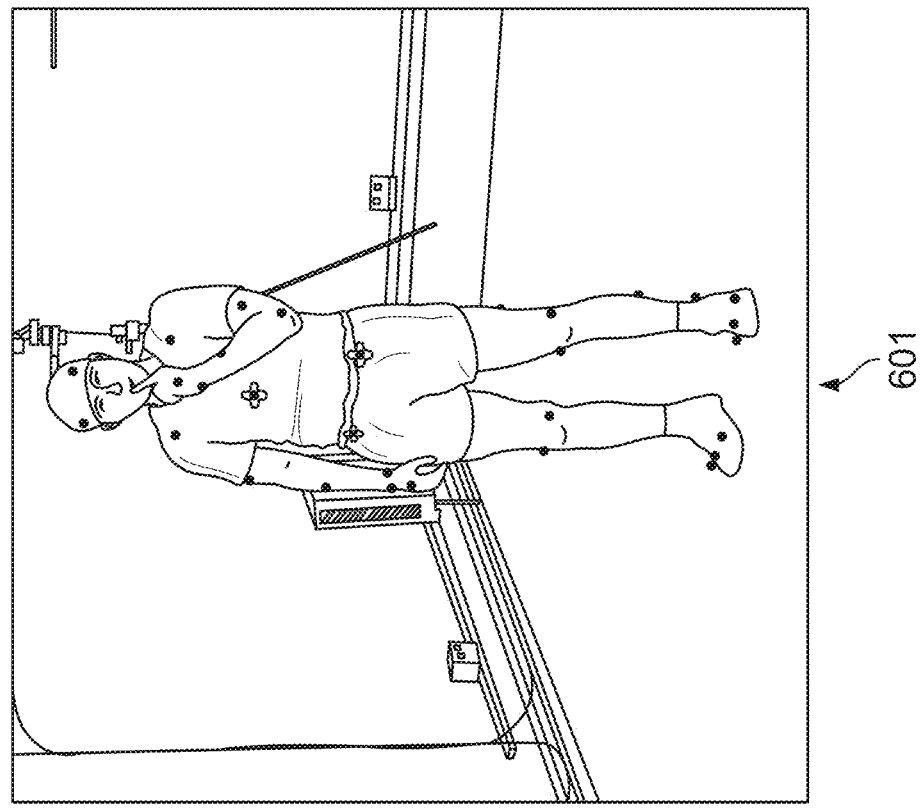

FIGS. 6A-B illustrates an example of detection of orientation keypoints according to an illustrative embodiment of the present disclosure. FIG. 6A shows ah image 601 with ground truth data 603 and predictions enabled by the described embodiments including joint predictions, pose predictions, and rotation angles. Handles such as 607, shown in FIG. 6B, indicate a forward orientation while handles such as 609 indicate a left orientation. At least some aspects of the present disclosure will now be described with reference to the following numbered clauses.

The invention claimed is:

1. An apparatus, comprising:
   a processor; and
   a memory storing instruction which, when executed by the processor, causes the processor to:
   receive an image;
   utilize at least one neural network to create a heatmap associated with the image; and
   utilize a lifter-refiner regression model to automatically correct the heatmap.

2. The apparatus of claim 1, wherein the heatmap comprises Gaussian targets.

3. The apparatus of claim 1, wherein the instructions, when executed by the processor, cause the processor to preprocess training data for training the at least one neural network.

4. The apparatus of claim 3, wherein the instructions, when executed by the processor, cause the processor to preprocess the training data in bulk.

5. A method comprising:
   receiving, by at least one processor, an image;
   utilizing, by the at least one processor, at least one neural network to create a heatmap associated with the image; and
   utilizing, by the at least one processor, a lifter-refiner regression model to automatically correct the heatmap.

6. The method of claim 5, wherein the heatmap comprises Gaussian targets.

7. The method of claim 5, further comprising preprocessing, by the at least one processor, training data for training the at least one neural network.

8. The method of claim 7, further comprising preprocessing, by the at least one processor, the training data in bulk.

9. A system, comprising:
   an apparatus, comprising:
   a processor; and
   a memory storing instruction which, when executed by the processor, causes the processor to:
   receive an image;
   utilize at least one neural network to create a heatmap associated with the image; and
   utilize a lifter-refiner regression model to automatically correct the heatmap.

10. The system of claim 9, wherein the heatmap comprises Gaussian targets.

11. The system of claim 9, wherein the instructions, when executed by the processor, cause the processor to preprocess training data for training the at least one neural network.

12. The system of claim 11, wherein the instructions, when executed by the processor, cause the processor to preprocess the training data in bulk.

* * * * *